UNITED STATES PATENT OFFICE.

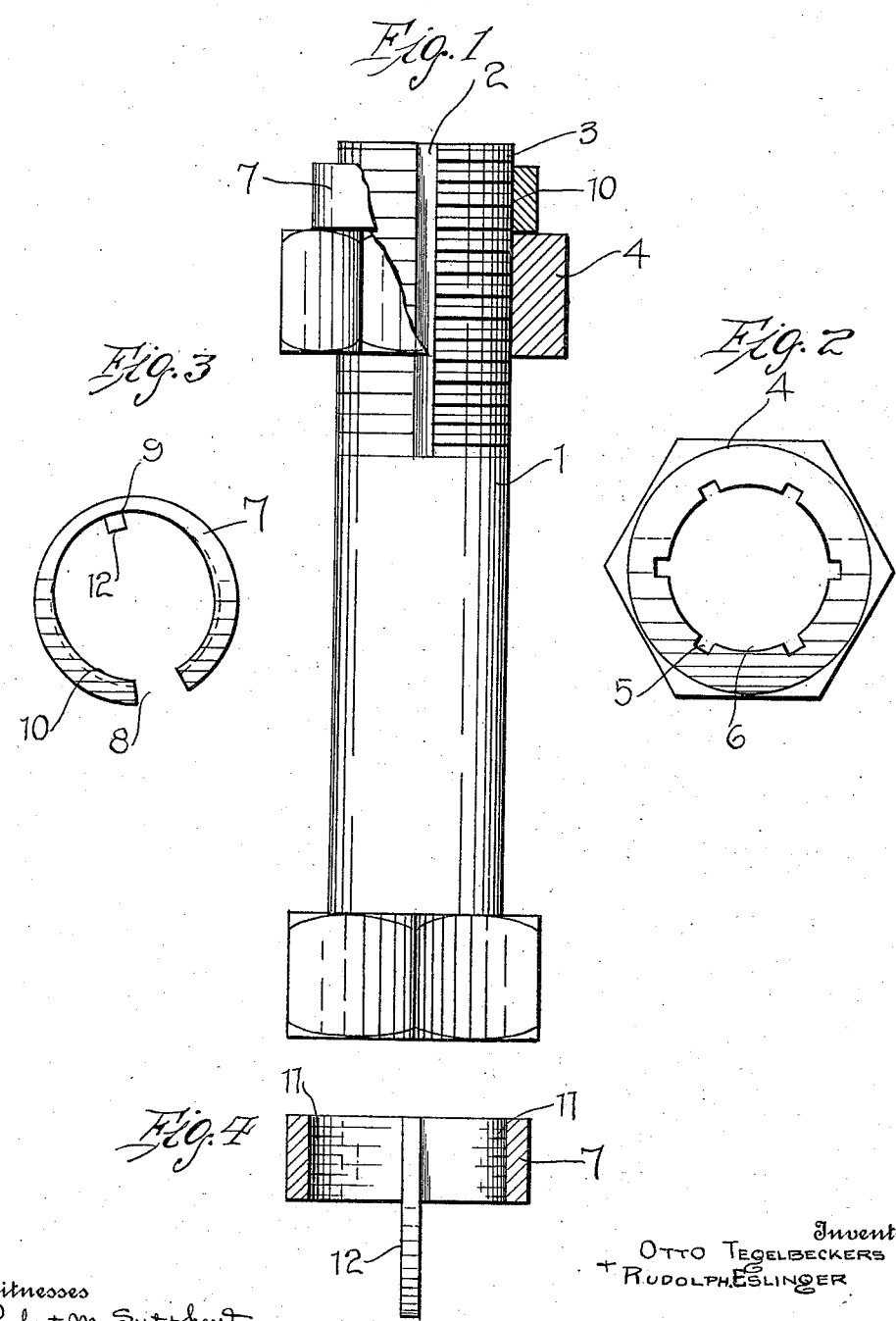

OTTO TEGELBECKERS AND RUDOLPH ESLINGER, OF TAMPA, FLORIDA, ASSIGNORS OF ONE-THIRD TO JOHN H. MILLER, OF TAMPA, FLORIDA.

NUT-LOCK.

1,066,339.     Specification of Letters Patent.     Patented July 1, 1913.

Application filed February 21, 1913. Serial No. 749,970.

*To all whom it may concern:*

Be it known that we, OTTO TEGELBECKERS and RUDOLPH ESLINGER, citizens of the United States, residing at Tampa, in the county of Hillsboro and State of Florida, have invented certain new and useful Improvements in Nut-Locks, of which the following is a specification, reference being had to the accompanying drawings.

This invention relates to new and useful improvements in nut locks and more particularly to an improved form of locking nut designed to retain the main nut in a locked position upon the bolt, the object of the invention being to provide a spring nut which is adapted to be clamped to the threaded end of the bolt outside of the nut to lock the nut upon the bolt, and is of such construction that the same may be quickly and easily placed upon the bolt or removed therefrom. Another object of the invention being to provide a nut lock of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is an elevation of a bolt illustrating our improved nut lock applied thereto, the same being broken away and in section; Fig. 2 is a top plan view of the nut; Fig. 3 is an elevation of the locking member; and Fig. 4 is a transverse sectional view of the same.

Referring more particularly to the drawings, 1 indicates a bolt having a longitudinal recess 2 formed in the threaded end 3 thereof. A nut 4 is threaded upon the end 3 and is provided upon its outer end with the recesses 5 formed around the bolt receiving opening 6 and adapted to communicate with the recess 2 in the bolt.

The numeral 7 indicates our improved nut lock which comprises a ring of spring metal, preferably steel or the like, and having one side split, as shown at 8. The intermediate portion of the ring 7 is formed of thin metal, as clearly shown at 9, to provide sufficient resiliency whereby the ring may be readily engaged or disengaged from the threaded end of the bolt. The ends of the ring are enlarged, as shown at 10, and provided upon the interior thereof with the screw threads 11 adapted to engage with the threads upon the bolt to prevent longitudinal movement of the ring upon the bolt. By having the end portions 10 enlarged, the ring is not weakened by reason of the threads cut therein, but on the other hand is of substantially uniform strength throughout. The ring 7 is held against rotary movement upon the threaded end of the bolt by means of the longitudinal rib or key 12, formed upon the inner side of the ring at the intermediate portion and adapted to engage within the longitudinal slot 2.

The lower end of the rib 12 extends downwardly beyond the edge of the ring and is adapted to project into one of the recesses 5 to hold the nut 4 against rotary movement upon the bolt. The ring 7 may be readily placed upon the bolt by inserting the end of a screw driver or similar tool between the ends and turning the same to spread the ends of the ring sufficiently so that it may be arranged upon the end of the bolt.

From the above it will be seen that we have provided a spring nut lock which can be quickly and readily applied to the end of the bolt outside of the nut and held against rotary and longitudinal movement to retain the nut in position and is also provided with means for preventing rotary movement of the nut when the device is applied. It will be apparent that we have provided a simple and durable nut which is effective in its operation and which can be manufactured at a comparatively low cost.

While we have shown and described the preferred form of our invention, it will be obvious that various changes in the details of construction and in the proportions may be resorted to for successfully carrying our invention into practice without sacrificing any of the novel features or departing from the scope of the appended claim.

What we claim is:—

In a device of the character described, the combination of a bolt having screw threads and provided with a longitudinal groove; a nut screw threaded on the bolt and provided with a groove registering with the groove of the bolt; a resilient spilt ring having its respective end portions enlarged and formed with threads on the inner surfaces thereof, said ring clamped on the bolt immediately against the nut and having its threaded portions engaging with the threads of the bolt; and a key carried by the ring engaging
5 within said registering grooves and locking the nut on the bolt.

In testimony whereof we hereunto affix our signatures in the presence of two witnesses.

OTTO TEGELBECKERS.
RUDOLPH ESLINGER.

Witnesses:
W. S. CATHCART,
JAS. H. CATHCART.

Copies of this patent may be obtained for five cents each, by addressing the "Commissioner of Patents, Washington, D. C."